United States Patent [19]

Nakasaki et al.

[11] Patent Number: 5,186,772
[45] Date of Patent: Feb. 16, 1993

[54] RUN-FLAT TIRE AND RIM ASSEMBLIES FOR ATV

[75] Inventors: Eiji Nakasaki, Kakogawa; Yasuo Igarashi, Kawanishi, both of Japan

[73] Assignee: Sumitomo Rubber Industries, Ltd., Kobe, Japan

[21] Appl. No.: 598,812

[22] Filed: Oct. 17, 1990

Related U.S. Application Data

[63] Continuation of Ser. No. 229,497, Aug. 8, 1988, abandoned, which is a continuation-in-part of Ser. No. 935,261, Nov. 26, 1986, abandoned.

[30] Foreign Application Priority Data

Nov. 30, 1985 [JP] Japan .................................. 60-269920

[51] Int. Cl.⁵ ............................................ B60C 15/024
[52] U.S. Cl. .................................... 152/516; 152/522;
152/544; 152/546; 152/379.3
[58] Field of Search ................................ 152/516–525,
152/539, 541, 543, 544, 546, 547, 379.3, 379.4,
379.5, 380, 381.4, 381.6

[56] References Cited

U.S. PATENT DOCUMENTS

| 4,148,348 | 4/1979 | French et al. | 152/379.3 |
| 4,328,851 | 5/1982 | Randle | 152/522 X |

FOREIGN PATENT DOCUMENTS 128807 6/1987 Japan .................................. 152/522

*Primary Examiner*—Geoffrey L. Knable

[57] ABSTRACT

A run-flat tire and rim assembly for All Terrain Vehicles comprising: (A) a run-flat tire having beads with a radially inwardly protruding toe and a bead apex; (B) a rim having bead seats with a circumferentially extending groove with which the toe is engaged; (C) the height of the radially outer end of the bead apex being in a range of 15% to 30% of the tire section height; (D) the thickness of the rubber layer on the outside of a carcass in the tire sidewall regions being at least 10 times the diameter of the carcass ply cord; (E) the above-mentioned thickness decreasing gradually from a maximum tire section width point to the tire shoulder so as to form a weak portion in bending in each shoulder; (F) a circumferentially extending buttress provided in each shoulder; and (G) a hump with a diameter larger than the rim diameter formed axially inward of and adjacent to each bead seat of the rim.

10 Claims, 2 Drawing Sheets

RUN-FLAT TIRE AND RIM ASSEMBLIES FOR ATV

This application is a continuation of application Ser. No. 07/229,497 filed on Aug. 8, 1988, now abandoned, which is a continuation-in-part of application Ser. No. 06/935,261 filed on Nov. 26, 1986, now abandoned.

BACKGROUND OF THE INVENTION

The present invention relates to a tire and rim assembly for All Terrain Vehicles (ATV), in which the tire is prevented from slipped out from the rim even if the internal air is released by puncture or the like during running, and which is able to run under such a deflated condition.

In conventional pneumatic tires, the means of retaining the tire on a wheel rim is the internal air pressure, which passes the tire beads to the bead seats and flanges of the wheel rim. Accordingly, when the air pressure is decreased, the retention force is inevitably lowered.

Under such condition that the internal air pressure is rapidly decreased by puncture or the like, if a lateral force, for example that due to a sharp handling operation of the vehicle to avoid a possible accident, acts on the tire, it is transferred to the beads from the tread through the tire sidewalls and lifts the toe of one bead and the heel of another bead. As a result, the frictional force therebetween will be decreased, which leads to the bead slipping out from the bead seat and falling into the rim well for the tire mounting work. Such a dislocation of the tire leads not only to a lack of maneuverability but also to a dangerous situation wherein the tire drops off from the wheel rim.

To solve the above-mentioned problems, there has been proposed a tire and wheel rim assembly, wherein each bead of the tire is provided with a radially inwardly protruding toe, and each bead seat of the wheel rim is provided with a groove with which the toe is engaged, and the diameter of the resultant protrusion between the groove and the well is not more than the rim diameter.

On the other hand, pneumatic tires for ATV are used at a very low internal air pressure to increase its ground contacting area and to absorb shocks from the ground, and further the ATV tires are used in a very rough manner under high speed. Therefore, the sidewalls of the ATV tire is always subjected to side force, and the ATV tires are exposed to the danger of tire dislocation more than other kinds of tires not only in the abnormal condition in which the tire is punctured but also the normal operating conditions. Therefore, the above-mentioned system is insufficient for such a ATV tire.

Furthermore, the ATV tires are generally for sports use. It is therefore, desirable to reduce the tire weight to maintain good maneuverability.

SUMMARY OF THE INVENTION

An object of the present invention is therefore, to provide a run-flat tire and rim assembly for ATV, in which dislocation of beads from the bead seats, which is a major cause for ATV accidents, is prevented, and the ATV can continue to run after the tire becomes flat.

According to one aspect of the present invention, the run-flat tire and rim assembly comprises:

(A) a run-flat tire having a pair of beads each provided with a bead core and a bead apex extending radially outwardly from the bead core and having a radially inwardly protruding toe, a carcass ply of cords extending from one bead to the other bead, and turned up around the bead cores at both of its edge portions, and a tread and sidewalls disposed outside the carcass ply so as to form a rubber layer extending from one bead to the other bead;

(B) a rim having a pair of bead seats on which the beads are located, a well between the bead seats, a flange extending radially outwardly from the axially outer edge of each bead seat, and a circumferentially extending groove in each bead seat with which the toe is engaged;

(C) the height of the radially outer end of each bead apex from a bead base being in a range of 15% to 30% of the tire section height;

(D) the thickness of the rubber layer in a region on each side of the tire from the bead to the shoulder of the tire being at least 10 times the diameter of the carcass ply cord;

(E) the above-mentioned thickness decreasing gradually from a maximum width point at which the section width of the tire is maximum to the shoulder so as to form a weak portion in bending in each shoulder;

(F) a circumferentially extending buttress provided in each shoulder of the tire; and (G) a hump with the diameter larger than the rim diameter formed axially inward of and adjacent to each bead seat of the rim.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE INVENTION

An embodiment of the present invention will now be described by way of example with reference to the accompanying drawings.

Figure 1:
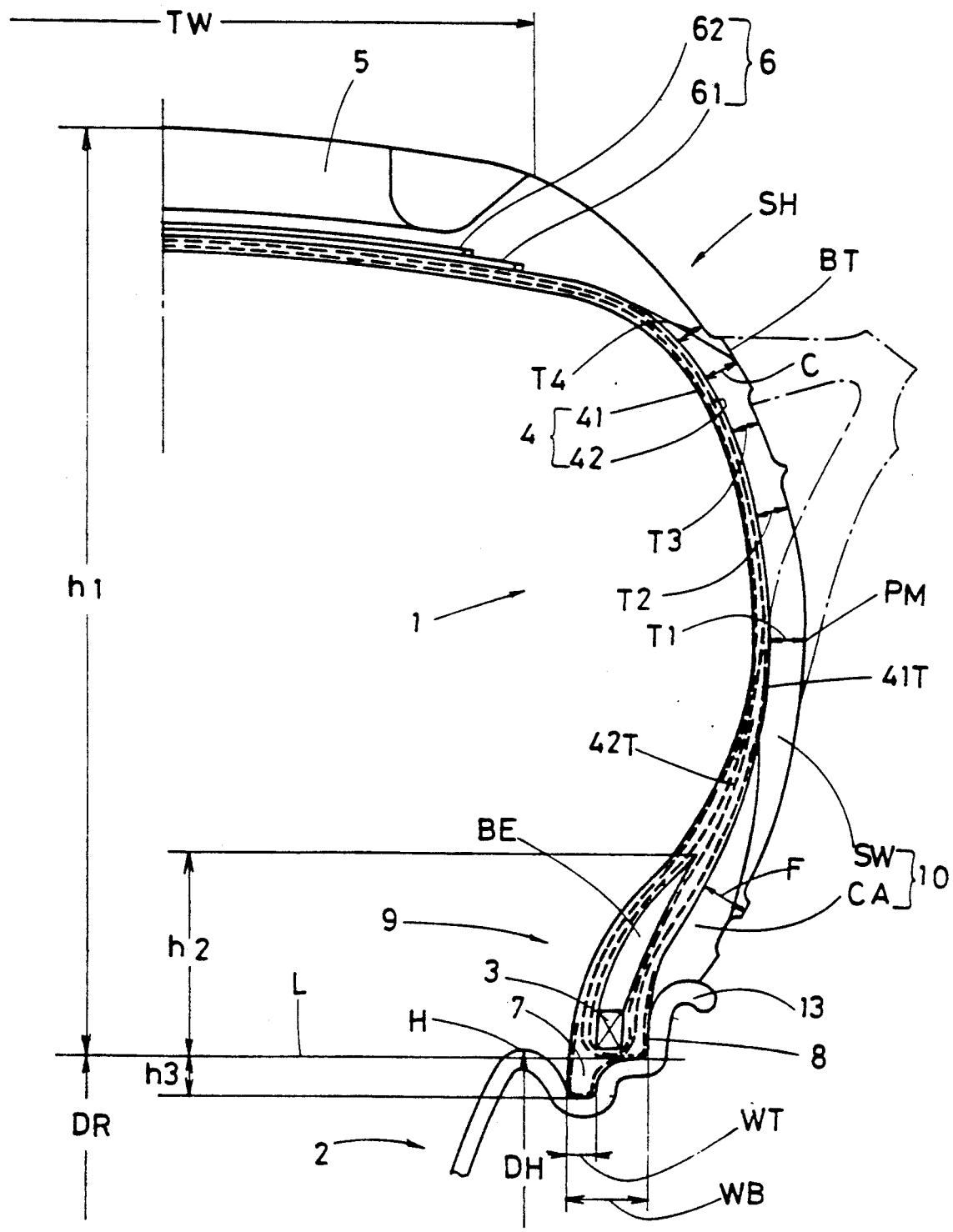
FIG. 1 is a sectional view showing an embodiment of the present invention.

In FIG. 1, the tire 1 comprises a pair of bead cores 3, a pair of bead cores BE, a toroidal carcass 4, a tread 5, a pair of sidewalls 10, and a belt 8.

Each bead core 3 is made of inextensible cords such as steel wires, and disposed in each bead 9 of the tire.

Each bead apex BE extends radially outward from each bead core decreasingly in thickness. The bead apexes are made of a rubber compound having 80 to 95 degrees JIS A hardness.

The carcass extends across the bead, and has parallel organic fiber cords such as Nylon, Polyester, Rayon and/or Aromatic polyamide, of which both ends are turned up around the bead cores. The carcass 4 of FIG. 1 is composed of two carcass plies 41, 42 of cords laid radially at an angle of 70 to 90 degrees to the equatorial plane of the tire. The edges of each carcass ply are turned up around the bead cores 3 from the axially inside to the outside thereof, and the turnup 41T of the ply 41 is located axially outward of the turnup 42T of the ply 42. The turnup 42T extends radially outward along the axially outside of the bead apex BE beyond the end thereof, and also the turnup 41T extends radially outward along the axially outside of the turnup 42T beyond the end thereof. In addition to the above-mentioned radial construction, the carcass in the present invention can also employ a bias construction in which at least two plies of parallel cords are arranged so that the cords in one ply cross those of other ply.

The tread 5 of rubber is disposed around the crown of the carcass.

The sidewalls 10 are disposed outside the carcass, and each sidewall extends from each edge of the tread 5 to the bead 9 along the outside of the carcass in its radially outer portion and along the outside of the carcass turnup in the inner portion. Each sidewall 10 is made of rubber the 100% modulus of which is more than 12 kg/sq.cm.

In this embodiment, the sidewall 10 each comprises a sidewall rubber SW and a clincher apex CA of hard rubber having a JIS A hardness of 70 to 85 degrees.

The sidewall rubber SW extends radially inwardly from the edge of the tread rubber 5 along the outside of the carcass, and its inner portion is tapered.

The clincher apex CA extends radially outwardly and tapers from the rim flange 13 along the axially outside of the carcass turnup 41T to a portion of the same height as the end of the turnup 42T. Furthermore, the clincher apex overhangs the rim flange as a prop for the sidewall.

The outside of the tapered portion of the apex CA is overlaid with the tapered portion of the sidewall SW.

The belt 6 is disposed between the tread 5 and the carcass 4. The belt is composed of inextensible cords laid at an angle of 10 to 30 degrees to the equatorial line of the tire, in this embodiment, composed of two plies 61 and 62 of steel cords. Preferably, the width of the belt, in this embodiment the width of the widest inner ply 61 is substantially equal to the tread width TW or the ground contacting width, whereby the tread portion is reinforced to increase its rigidity, and the stability in straight running and the resistance to puncture are improved.

Each bead 9 is provided axially inward of the bead core with a toe 7. The toe protrudes radially inwardly from the bead base L, and extends continuously in the circumferential direction of the tire.

The toe is made of a rubber compound or elastomer having a JIS A hardness of 80 to 90 degrees.

Preferably, each bead 9 is provided with a fiber cord reinforcing layer 8 for the toe, which is, as shown in FIG. 1, disposed along the profile of the toe from the inside to the outside of the bead 9. Furthermore, the toe may be provided with a core made of a hard rubber compound, plastic, fibers or the like, harder than the surrounding elastomer to increase its retention force.

Figure 2:
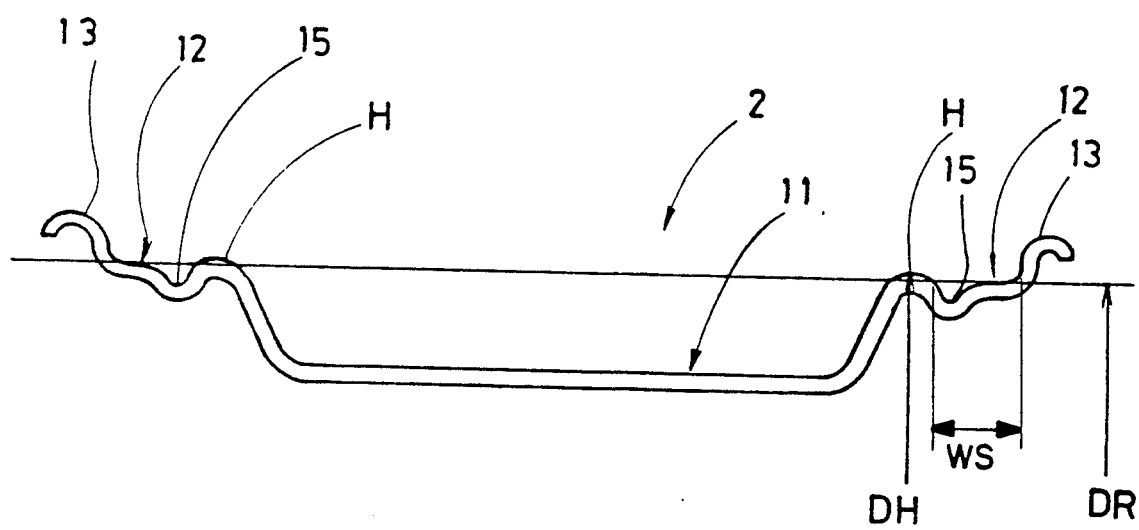
FIG. 2 is a sectional view showing the wheel rim thereof.

FIG. 2 shows a rim on which the above-mentioned tire 1 is mounted, wherein the rim 2 has a pair of bead seats 12, a pair of humps H, a well 11 therebetween, and a pair of flanges 13.

Each bead seat 12 is formed at each side of the rim to support the beads 9 of the tire 1 located thereon, and the bead seats are tapered axially inward.

Each hump H is located axially inward of and adjacent to each bead seat, and protrudes radially outwardly from the tapered bead seat. The radially outer end of the hump H is formed flat and the diameter thereof is larger than the rim diameter DR, wherein the rim diameter is defined as the diameter at the axially outermost end of the bead seat, that is, the diameter of the bead base L.

Each bead seat 12 is grooved to form a circumferentially extending groove 15 with which the toe 7 of the tire 1 is engaged. In this embodiment, each groove 15 is located at the axially innermost area of the bead seat, that is, an area adjacent to the hump H. Each bead seat has a smoothly continuous decline from the axially outermost end to the groove bottom and a steep acclivity from the groove bottom to the inner end thereof.

Each flange 13 extends radially outwardly from the axially outermost end of each bead seat.

The well 11 is a portion of the rim between the above-mentioned two humps H, and the diameter thereof is smaller than the rim diameter DR.

The wider WS of the bead seat 12, in this embodiment which is defined as an axial distance between the flange 13 and the hump H, is substantially equal to the width WB of the bead 9.

The width WT of the toe 7 is in a range of 25 to 50% of the width WB of the bead.

The height of the toe 7, which is defined as a radially inward height of the radially innermost end of the toe 7 from the bead base L, is in a range of 3 to 6% of the tire section height h1.

The height h2 of the radially outer end of the bead core 3 is in a range of 15 to 30%, more preferably 20 to 25% of the tire section height h1, wherein both the heights are measured from the bead base L. When the height h2 is less than 15%, the bead becomes insufficient in lateral rigidity to endure the repeated deformation while running deflated, and will tend to fatigue. On the contrary, when the height h2 is more than 30%, a stress concentration tends to occur at the tip of the head apex, which leads to the formation of a crack.

Furthermore, in the present invention, the thickness of the sidewall 10 is limited so that the thickness thereof decreases gradually toward the shoulder SH of the tire from a maximum width point PM at which the section width of the tire is at a maximum.

The sidewalls and the tread as a rubber layer on the outside of the carcass, therefore, has a minimum thickness in each shoulder SH of the tire.

As a result, the tire is provided with a weak portion in bending in each shoulder region.

Furthermore, the tire is provided with a buttress BT in each weak portion. The buttress BT is a circumferentially continuously extending protrusion, the thickness C of which is larger than that of the weak portion, that is, larger than the thicknesses T3 and T4 at both sides of the buttress. Accordingly, such buttress induces a bending therealong.

Accordingly, the rigidity of the portions of the tire radially outward of the maximum width points PM decreases outwardly by the above-mentioned thickness distribution.

On the other hand, by the carcass plies 41 and 42, the carcass ply turnups 41T and 42T, the bead apex BE, the clincher apex CA, and the reinforcing layer 8, the tire is reinforced in portions radially inward of the maximum width points PM, whereby the rigidity thereof is largely increased.

Accordingly, when the tire is deflated or becomes flat, on the under side of the tire a sharp bend is caused along each buttress BT, that is, the bending deformation is concentrated at the weak portions. Each sidewall moves axially outwardly as shown in FIG. 1 by the chain line, and the larger the radially outer position, the larger is the movement. However the bead 9, especially in the portion radially inward of the thickness F portion, does not move. As the result, the bead toe is prevented from lifting.

Furthermore, in the present invention, the diameter DH of the hump H is set to be larger than the rim diameter DR. Accordingly, it becomes more difficult for the toe to move inwardly over the hump.

The dislocation of the beads from the head seats is therefore effectively prevented.

On the other hand, when the sidewalls are moved outwardly as mentioned above, compressive stress is generated in the rubber on the outside of the carcass ply.

Therefore, in the present invention, the thickness of the sidewall is further limited as being at least 10 times the diameter of the carcass ply cord, whereby the rigidity of the sidewalls is so increased that the sidewalls provide a radial support sufficient to run deflated, that is, when the internal air is last. However, when the thickness is less than 10 times, the vertical rigidity becomes insufficient to run deflated.

As a result, there is no need to add a reinforcing rubber layer on the inside of the carcass in the sidewall regions, which makes it possible to reduce the tire weight.

As described above, in the present invention, the tire is firmly mounted on the rim even if subjected to a side force under low or no air pressure, and the ability to run flat, that is, the ability to run under a deflated state is improved. Furthermore, the tire can be mounted on the rim in a conventional way, that is, by setting the beads into the well over the flange, and then applying air through the valve. Accordingly, the air pressure presses the beads onto the bead seats and presses the flanges over the humps, and the toes are pushed into the respective grooves, and then the tire is firmly mounted on the rim.

The following are the specifications of the tire and rim assembly shown in FIGS. 1 and 2.

| Tire | |
|---|---|
| Size | 600 × 300R9.5 |
| Section height h1 | 180 mm |
| Sidewall rubber: | |
| Thickness | |
| T1 | 7 mm |
| T2 | 6 mm |
| T3 | 5 mm |
| T4 | 5 mm |
| C | 7 mm |
| F | 9 mm |
| 100% modulus | 15 kg/sq · cm |
| Bead apex: | |
| Height h2 | 40 mm |
| Hardness | 85 deg. |
| Belt: | |
| Cord angle | 15 deg. |
| Cord material | steel/2 cut |
| Carcass: | |
| Cord | 1000 d/2 Polyester |
| Cord angle | 90 deg. |
| Bead width WB | 18 mm |
| Bead toe: | |
| Height h3 | 7.2 mm |
| Width WT | 8 mm |
| Rim size | 230 × 9.5 |

In addition, the hump and the toe may employ any shape as long as they can engage with each other to prevent the slipping-out of the bead from its seat.

We claim:

1. A run-flat tire and rim assembly comprising:
   (A) a run-flat tire having
      a pair of beads each provided with a bead core and a bead apex extending radially outwardly from said bead core and having a radially inwardly protruding toe,
      a carcass ply of cords extending from one bead to the other bead and turned up around said bead cores at both of its edge portions, and
      a tread and a pair of sidewalls disposed outside said carcass ply so as to form a rubber layer extending from one bend to the other bead thereof, a shoulder being formed at the intersection of said tread with each of said sidewalls, the shoulder including a buttress portion;
   (B) a rim having
      a pair of bead seats on which said beads are located,
      a well located between said bead seats,
      a flange extending radially outwardly from the axially outer edge of each said bead seat,
      a circumferentially extending groove provided in each said bead seat with which said toe is engaged, and
      a pair of circumferentially extending protrusions, one of said protrusions being located axially between said well and each said groove of each of said bead seats, the apex of each said protrusion extending radially outward from the central axis of said rim to a greater extent than said bead seat associated therewith;
   (C) the height of the radially outer end of each bead apex from a bead base being in a range of 15% to 30% of the tire section height; and
   (D) the thickness of the rubber layer in a region on each side of the tire from said bead to the buttress portion being at least 10 times the diameter of the carcass ply cord.

2. The tire and rim assembly as set forth in claim 1, wherein said toe of the tire bead is made of a rubber compound having JIS A hardness of 80 to 95 degrees.

3. The tire and rim assembly as set forth in claim 1, wherein the 100% modulus of the rubber layer in said region on each side of the tire from said bead to the shoulder of the tire is more than 12 kg/sq.cm.

4. The tire and rim assembly as set forth in claim 1, wherein said toe of the tire bead is reinforced by a reinforcing layer being disposed along the profile thereof from the inside to the outside of the bead.

5. The tire and rim assembly as set forth in claim 1, wherein the radially inward height of the innermost end of said toe of the tire bed is in a range of 3 to 6% of the tire section height when measured from the bead base.

6. The tire and rim assembly as set forth in claim 1, wherein the width of said toe of the tire bead is in a range of 25 to 50% of the width of the bead base.

7. The tire and rim assembly as set forth in claim 1 wherein each said sidewall includes a clincher apex.

8. The tire and rim assembly as set forth in claim 7 wherein said clincher apex overhangs said flange.

9. The tire and rim assembly as set forth in claim 7 wherein said clincher apex has a JIS A hardness of 70 to 85 degrees.

10. The tire and rim assembly as set forth in claim 9 wherein said clincher apex overhangs said flange.

* * * * *